S. B. HAZARD.
COUPLING FOR DOUBLE AND SWINGLE TREES.
APPLICATION FILED FEB. 25, 1909.
945,945.
Patented Jan. 11, 1910.
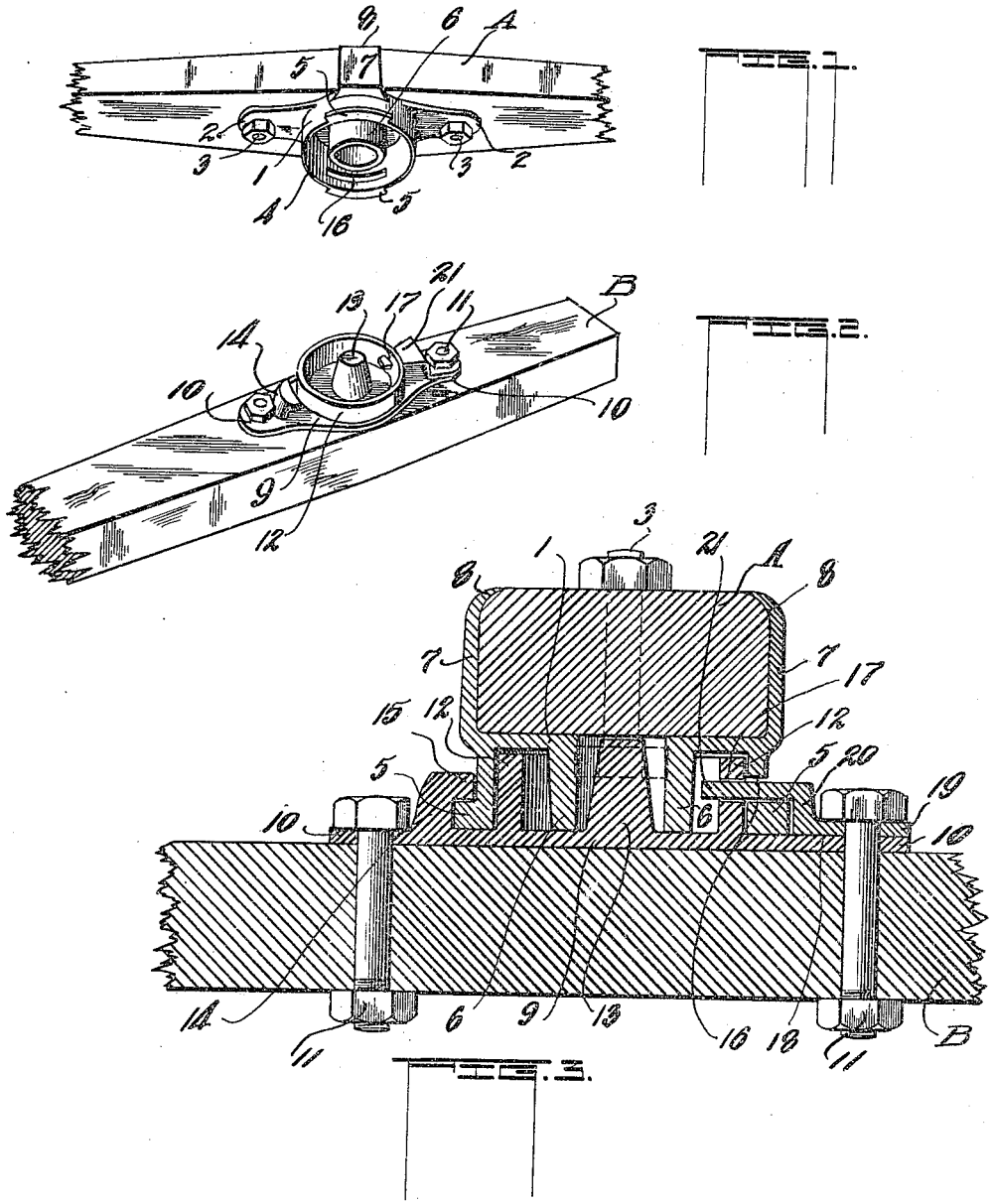

UNITED STATES PATENT OFFICE.

SAMUEL B. HAZARD, OF PEORIA, ILLINOIS.

COUPLING FOR DOUBLE AND SWINGLE TREES.

945,945.

Specification of Letters Patent.   Patented Jan. 11, 1910.

Application filed February 25, 1909.   Serial No. 479,990.

*To all whom it may concern:*

Be it known that I, SAMUEL B. HAZARD, a citizen of the United States, residing at Peoria, in the county of Peoria and State of Illinois, have invented certain new and useful Improvements in Couplings for Double and Swingle Trees; and I do hereby declare that the following is a full, clear, and exact description of the invention, which will enable others skilled in the art to which it appertains to make and use the same.

This invention has reference to an improved coupling for connecting a doubletree to a pole, which is also useful as a coupling between the double and swingle-trees and may be extended for use in various directions in the arts of manufacture.

My object is to present a boltless coupling between two parts and to so unite or connect the same that such parts may have a pivotal connection, whereby one of the parts may partially rotate or be oscillated on the other of said parts, and to so couple the parts that there is little or no danger of their becoming uncoupled in use.

In carrying out my present invention, I have had in mind the cost of manufacture and durability of the device, and believe that I have not only reduced the cost to a minimum, but have also produced a durable connection composed of the fewest number of parts possible.

In the drawings:—Figure 1 is a perspective view of the underside of a double-tree or other part, with one section of my boltless coupling shown attached thereto; Fig. 2 is a perspective view of the upper side of a pole, shaft or other part with the other section of my boltless coupling shown attached thereto, and also a locking member attached to said section which coöperates with the two sections when united, and Fig. 3 is an enlarged sectional view showing the double-tree mounted on the pole or shaft and coupled thereto by my improved boltless coupling.

Like characters of reference indicate corresponding parts throughout the figures.

1 designates the section attached or secured to a double-tree A and consists of a plate having ear extensions 2 by means of which said section may be bolted as at 3 or otherwise suitably secured to said double-tree A. 4 is an annular flange or ring formed on and projecting from said plate or section 1 which is provided with a plurality of radially projecting lugs or flanges 5 extending a suitable distance around the outer face of said flange or ring, and 6 denotes a tubular bearing formed on said plate or section 1, with its outer wall spaced a suitable distance from the inner wall of the flange or ring 4, as shown.

Supplemental securing means for the section 1 to the double-tree A may be employed if desired, and consists of the plate projections 7 which will extend up alongside of the front and rear faces of the double-tree A and bent down to bear against the upper edges thereof, as shown at 8. Constructing the section 1 of malleable iron, the projections 7 can be very easily bent over or down against the double-tree without fear of breaking or weakening the parts. Should the connections 3 for securing plate or section 1 under undue strain become broken, the section or plate 1 is prevented from becoming loosened or detaching itself on account of the projections 7 engaging the double-tree A in the manner shown.

9 designates the section attached or secured to the pole, shaft or other part B, to which it is intended to couple the part A, through and by means of the section 1. Said section 9 consists of a plate having ear extensions 10 by means of which said section may be bolted as at 11 or otherwise suitably secured to said pole or shaft B. 12 is an annular flange or ring formed on and projecting from said plate or section 9 and is intended when the sections 1 and 9 are united to extend up into the annular flange or ring 4 of said section 1, and 13 denotes a center projection or stem on said section or plate 9, which, when the sections 1 and 9 are united, as stated, extends into and has a suitable bearing in the tubular bearing 6, of said section 1.

To one of the ears 10 of the plate or section 9, is secured or attached a lug 14 which projects upwardly a suitable distance and is then bent inwardly as at 15 forming an overhanging projection or shed which will coöperate with one of the lugs or flanges 5 on section 1 to retain said sections 1 and 9 in operative relation.

The flange or ring 4 of the plate or section 1 has a slot or cut-out portion 16 of suitable length, in its wall and preferably disposed above one of the lugs or flanges 5 on said ring. Likewise, the flange or ring 12 of the plate or section 9 has a slot or cut-out portion 17 in its wall, preferably not so long as the cut-out portion 16 in flange 4, but so disposed that when the sections are united and in operative position, the cut-out portion 17 will coincide with the cut-out portion 16 in section or plate 1.

18 designates a lock, which, together with the lug or flanges 5 of plate 1, retain the sections 1 and 9 in operative position, but the lock 18, unlike the lug 14 is detachably secured. The lock 18 consists of a plate having the portion 19 arranged to be bolted to one of the ears 10 of section 9 by means of a bolt 11, see Figs. 2 and 3 and said plate is bent upwardly as at 20 and formed with the forward projection 21, preferably tapered as shown. When the sections 1 and 9 are united, the projection 21 of the locking plate 18 is inserted through the cut-out portion 17 in flange 12 of section 9 and the cut-out portion 16 in the flange 4 of section 1.

To place the double-tree A on the pole or shaft B, and to unite the sections 1 and 9 to produce the coupling for said double-tree and pole in the manner described, the double-tree is placed in a position which will allow the flange 12 and stem 13 of plate or section 9 to be inserted up into the flange 4 and tubular bearing 6 of plate or section 9, when the double-tree is swung around into a position, approximately at right angles to the pole or shaft B, causing one of the flanges or lugs 5 on the section 1 to slide beneath the overhanging shed portion 15 of the lug or projection 14 on the section 9; this will bring the cut-out portion 16 of flange 4, coincident with the perforation 17 in the flange 12, when the projection 21 of the locking plate 18 is inserted through the cut-out portions 17 and 16 and over a flange or lug 5 on plate 1, then bolted to the section 1 in manner described. The overhanging shed 15, and the projection 21, of the locking plate, will prevent the double-tree from becoming disconnected from the pole and yet will allow the double-tree to be oscillated on said pole, such oscillation being limited by the length of the cut-out portion 16 in the flange of section 1.

It is, of course understood that in providing such a coupling as I have shown between a double-tree and a pole, and which also may be used for connecting swingle-trees to double-trees, I have obviated the weakening of the parts by the omission of the usual bolt or stem, forming a fulcrum or pivot, by means of which the parts have usually been connected, and have further obviated the use of straps which have been usually connected at the opposite ends of the double-trees with portions of the pole, and also the straps between the swingle-trees. There must of course, be a certain amount of play for the double-tree on the pole, and the swingle-tree on the double-trees, which will allow of their oscillation when the horses pull in advance of each other; this motion is permitted in the provision of the cut-out portion 16 in the flange 4, which may be of any length desirable, and passing the plate 20 through said cut-out portion 16, will, as will be understood, limit the movement of the double-tree on the pole, or the swingle-trees on the double-trees, and thereby do away with the straps to which I have just referred.

I have shown the flange 4 provided with only two flanges or lugs 5 disposed diametrically opposite to each other, and locking means on the section 9 to correspond thereto, but it is understood that two or more may be provided, as may be deemed advisable.

Having thus fully described my invention, what I claim and desire to secure by Letters Patent of the United States, is:—

1. In a coupling of the character described, the combination of two inter-coöperating members, both of which are provided with cut-out portions arranged to coincide, a locking lug on one member, a plurality of lugs on the opposite member, one of said lugs arranged to coöperate with the locking lug on the opposite member, and a combined locking and stop plate for said members, having an extension passing through the coinciding cut-out portions in said members.

2. In a coupling of the character described, the combination of a plate provided with an annular flange having a cut-out portion and a plurality of radially arranged projections, a second plate provided with an annular flange having a cut-out portion and arranged to be inserted within the flange of the first mentioned plate, a locking lug on said second plate arranged to coöperate with one of the projections of said first mentioned plate, and a plate adapted to be detachably connected with said second plate and to pass through the cut-out portions in both of said plates, over the other of said projections on said first mentioned plate.

3. In a coupling of the character described, the combination of a pole, a plate attached thereto provided with an annular flange having a cut-out portion, and a center stem, a locking lug on said plate, a double-tree, a plate attached thereto provided with an annular flange having a cut-out portion, a tubular bearing for the stem of the plate on the pole, a plurality of radially disposed projections on the flange of said last mentioned plate, one of which is arranged to coöperate with the locking lug on said first mentioned plate, and a member attached to said plate of the pole and having a portion adapted to extend through the cut-out portions in the flanges of the respective plates.

4. In a coupling of the character described, the combination of two inter-coöperating members, both of which are provided with cut-out portions arranged to coincide, a locking lug on one member, a flange on the opposite member, arranged to coöperate with the locking lug on said first mentioned member, and a plate secured against one of said members and having an extension passing through the coinciding cut-out portions of both of said members.

5. In a coupling of the character described, the combination of a pole and a cross-piece therefor, a plate secured to said pole and having a flange provided with a cut-out portion, a locking lug also projecting from said plate, a plate secured to said cross piece and having a flange provided with a cut-out portion, arranged to coincide with the cut-out portion in said first mentioned plate, means on said second mentioned plate adapted to coöperate with the locking lug of the first mentioned plate to retain the plates in operative relation, and a stop plate secured against one of said flanged plates and having an extension passing through the coinciding cut-out portions of both of said plates.

In testimony whereof I affix my signature, in presence of two witnesses.

SAMUEL B. HAZARD.

Witnesses:
CHAS. W. LA PORTE,
LAURA E. CLAYPOOL.